(12) United States Patent
Lee

(10) Patent No.: US 6,937,305 B2
(45) Date of Patent: Aug. 30, 2005

(54) CHOLESTERIC LIQUID CRYSTAL COLOR FILTER LAYER AND MANUFACTURING METHOD THEREOF

(75) Inventor: Joun-Ho Lee, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 244 days.

(21) Appl. No.: 10/026,480

(22) Filed: Dec. 27, 2001

(65) Prior Publication Data

US 2003/0020855 A1 Jan. 30, 2003

(30) Foreign Application Priority Data

May 23, 2001 (KR) ........................................ 2001-28401

(51) Int. Cl.$^7$ ............................................. G02F 1/1335
(52) U.S. Cl. ........................ 349/115; 349/191; 349/175; 349/98; 349/13
(58) Field of Search ................................ 349/115, 175, 349/96, 191, 13, 117, 118, 113, 110, 97, 176, 185, 106; 3359/64, 65, 66

(56) References Cited

U.S. PATENT DOCUMENTS

| | | | | |
|---|---|---|---|---|
| 3,812,394 A | * | 5/1974 | Kaplan | 313/467 |
| 5,587,819 A | * | 12/1996 | Sunohara et al. | 349/106 |
| 5,926,236 A | * | 7/1999 | den Boer et al. | 349/51 |
| 5,943,108 A | * | 8/1999 | Hiyama et al. | 349/106 |
| 6,008,872 A | * | 12/1999 | den Boer et al. | 349/106 |
| 6,573,654 B2 | * | 6/2003 | Juestel et al. | 313/586 |
| 6,671,025 B1 | * | 12/2003 | Ikeda et al. | 349/156 |
| 2002/0041156 A1 | * | 4/2002 | Juestel et al. | 313/586 |
| 2002/0113921 A1 | * | 8/2002 | Jiang et al. | 349/96 |

FOREIGN PATENT DOCUMENTS

| | | | | |
|---|---|---|---|---|
| JP | 11-344703 | * | 6/1998 | ........... G02F/1/133 |
| JP | 11-344703 | | 12/1999 | |
| JP | 2000356769 | * | 12/2000 | ...... G02F/001/1335 |
| KR | 2000-0002827 | | 1/2000 | |

* cited by examiner

*Primary Examiner*—Nathan J. Flynn
*Assistant Examiner*—Fazli Erdem
(74) *Attorney, Agent, or Firm*—McKenna Long and Aldridge LLP

(57) ABSTRACT

A cholesteric liquid crystal (CLC) color filter layer for reflective LCD device includes an additional blue CLC color filter in the red and/or green CLC color filter to increase a color temperature. Since the additional blue CLC color filter is formed using ultraviolet light when forming the blue CLC color filter, additional manufacturing processes for the additional blue CLC color filter are not required. Furthermore, since the color temperature of output light increases according to the CLC color filter layer of the present invention, the high resolution is obtained in image display. Alternatively, the color temperature can be adjustable by way of forming an additional red and/or green CLC color filter in the blue CLC color filter.

25 Claims, 7 Drawing Sheets

CHOLESTERIC LIQUID CRYSTAL COLOR FILTER LAYER AND MANUFACTURING METHOD THEREOF

This application claims the benefit of Korean Patent Application No. 2001-28401, filed on May 23, 2001, which is hereby incorporated by reference as if fully set forth herein.

BACKGROUND OF THE INVENTION

1. Field of the Invention

The present invention relates to a liquid crystal display (LCD) device, and more particularly, to a cholesteric liquid crystal color filter layer for use in a reflective LCD device.

2. Description of the Related Art

Until now, the cathode-ray tube (CRT) has been generally used for display systems. However, flat panel displays are increasingly beginning to be used because of their small depth dimensions, desirably low weight, and low power consumption requirements. Presently, thin film transistor-liquid crystal displays (TFT-LCDs) are being developed with high resolution and small depth dimensions.

Generally, liquid crystal display (LCD) devices make use of optical anisotropy and polarization properties of liquid crystal molecules to control alignment orientation. The alignment direction of the liquid crystal molecules can be controlled by application of an electric field. Accordingly, when the electric field is applied to liquid crystal molecules, the alignment of the liquid crystal molecules changes. Since refraction of incident light is determined by the alignment of the liquid crystal molecules, display of image data can be controlled by changing the applied electric field.

Of the different types of known LCDS, active matrix LCDs (AM-LCDs), which have thin film transistors and pixel electrodes arranged in a matrix form, are of particular interest because of their high resolution and superiority in displaying moving images. Because of their light weight, thin profile, and low power consumption characteristics, LCD devices have wide application in office automation (OA) equipment and video units. A typical liquid crystal display (LCD) panel may include an upper substrate, a lower substrate and a liquid crystal layer interposed therebetween. The upper substrate, commonly referred to as a color filter substrate, may include a common electrode and color filters. The lower substrate, commonly referred to as an array substrate, may include switching elements, such as thin film transistors (TFTs), and pixel electrodes.

The typical LCD devices require a light source to display images. As a light source, a backlight device is generally disposed at the rear surface of the LCD panel so that the light from the backlight device is incident upon the LCD panel and refracted by the liquid crystal molecules to display images. This LCD device is termed a transmission type LCD device. To transmit the light from the backlight device, the electrodes generating the electric field should be made of a transparent conductive material, and also the upper and lower substrates should be transparent.

FIG. 1 is a cross-sectional view of a pixel of a conventional LCD device. As shown, the LCD device includes lower and upper substrates 10 and 90 and a liquid crystal (LC) layer 100 interposed therebetween. The lower substrate 10 includes a thin film transistor (TFT) "T" as a switching element that transmits a voltage to the pixel electrode 81 to change the orientation of the LC molecules. A gate electrode 21 made of a metallic material is disposed on the first substrate 10, and a gate insulating layer 30 made of silicon nitride ($SiN_x$) or silicon oxide ($SiO_x$) is on the first substrate 10 to cover the gate electrode 21. An active layer 41 made of an amorphous silicon is formed on the gate insulating layer 30, especially over the gate electrode 21. Ohmic contact layers 51 and 52 made of a doped amorphous silicon are formed on the active layer 41. On the ohmic contact layers 51 and 52, a source electrode 61 and a drain electrode 62 made of a metallic material are disposed, respectively. Therefore, the TFT "T" includes the gate electrode 21, active layer 41, ohmic contact layers 51 and 52, and source and drain electrodes 61 and 62. Although not shown in FIG. 1, the gate electrode 21 is connected to a gate line (not shown), and the source electrode 61 is connected to a data line (not shown). The gate and data lines are perpendicular to each other to define a pixel region on the lower substrate 10.

Still referring to FIG. 1, a passivation layer 70 is disposed on the gate insulating layer 30 to cover the TFT "T" and has a drain contact hole 71 to expose a portion of the drain electrode 62. The pixel electrode 81 made of a transparent conductive material is formed on the passivation layer 70 and contacts the drain electrode 62 through the drain contact hole 71.

On the surface facing to the lower substrate 10, the upper substrate 90 includes a black matrix 91 that corresponds to the TFT "T". Although not shown in FIG. 1, the black matrix 91 is positioned in a place corresponding to the gate and data lines. A color filter 92 overlapping the black matrix 91 is disposed on the upper substrate 90 to produce a specific color. A common electrode 93 made of a transparent conductive material is formed on the color filter 92 to generate the electric field across the LC layer 100 in the combination with the pixel electrode 81. Although not shown in FIG. 1, a first alignment layer may be disposed over the TFT "T" and on the pixel electrode 81 adjacent to the LC layer 100. Moreover, a second alignment layer may be disposed on the common electrode 93. A first polarizer 110 and a second polarizer 120 are formed on the rear surface of the lower substrate 10 and on the front surface of the upper substrate 90, respectively. Optic axes of the first and second polarizers 110 and 120 are orthogonal to each other. A backlight device 130 is disposed below the first polarizer 110.

In the above-described LCD panel, the lower substrate 10 and the upper substrate 90 are respectively formed through different manufacturing processes, and then attached to each other. As previously described, the liquid crystal display devices make use of the optical anisotropy and polarization properties of the LC molecules. Since the LC molecules are thin and long, and the electric field is applied to the liquid crystal layer, the alignment direction of the LC molecules can be changed and controlled by the applied electric field. Accordingly, incident light from the backlight device 130 is modulated to display images.

FIG. 2 is a cross-sectional view illustrating color filters of FIG. 1. As shown, color filters 92a, 92b and 92c are formed on the upper substrate 90, and implement red (R), green (G) and blue (B) colors, respectively. Additionally, the color filters 92a, 92b and 92c are separated by the black matrix 91, as described in FIG. 1.

The normal human eye is very sensitive to color, especially small color differences. Perception of color is, however, qualitative and not quantitative. Words used to describe color such as Blue, Orange, Purple, and Pink conjure up images but are not exact. The most exacting way to measure color is to measure and note the relative reflectance or transmission of light from a color sample at numerous intervals along the visible spectrum. The result is known as a spectrophotometric curve as shown in FIG. 5. A spectrophotometer is the device used to generate such a curve. As widely known in the field of color theory, it is more practical to divide the color spectrum into just three components; Red (R), Green (G), and Blue (B). If numbers are attached to the relative intensities of each color component, they may be referred to as "Tristimulus values".

FIG. 3 is a graph illustrating relative spectral power with respect to a wavelength of spectrum. FIG. 4 is a graph demonstrating transmittance of light passing through color filters (R), (G) and (B). FIG. 5 a graph showing spectral tristimulus values with respect to a wavelength of spectrum.

Referring to FIGS. 3, 4 and 5, the tristimulus values X, Y and Z are obtained by the following formulas based on a color matching function adopted in CIE (Committee of International Emission).

$$X = k \int_{380}^{780} \Phi(\lambda) \bar{x}(\lambda) d\lambda$$

$$Y = k \int_{380}^{780} \Phi(\lambda) \bar{y}(\lambda) d\lambda$$

$$Z = k \int_{380}^{780} \Phi(\lambda) \bar{z}(\lambda) d\lambda$$

where $\Phi(\lambda)$ is spectrum of the object to be measured, and $\bar{x}(\lambda)$, $\bar{y}(\lambda)$ and $\bar{z}(\lambda)$ are color matching functions.

From the tristimulus values X, Y and Z equations expressed above, the chromaticity x, y, and z are obtained by:

$$x = \frac{X}{X+Y+Z}$$

$$y = \frac{Y}{X+Y+Z}$$

$$z = \frac{Z}{X+Y+Z}$$

As a result of these equations, the relationship of x, y and z is met to be x+y+z=1. All colors can be represented by the chromaticity x and y and the tristimulus value Y. The tristimulus value Y is a photometric value and represents luminance used to describe the differences in the intensity of the light reflected or transmitted by a color. The chromaticity x and y is represented in the chromaticity diagram by the combination of their chromaticity point, as shown in FIG. 6. In FIG. 6, all colors can therefore be expressed by one point within the triangle of the graph.

Meanwhile, as a monitor for the display device, a white color with a color temperature 6500K., which is close to the natural light, is generally required. To increase the brightness of the liquid crystal display device, the spectral power of the green-band wavelength increases, thereby resulting in the decrease of the color temperature. Further, the increase of the power of the green-band wavelength causes the decrease of the resolution.

Therefore, the power of the blue-band wavelength should be raised to increase the color temperature. As the chromaticity x and y in the chromaticity coordinate of FIG. 6 are lessened, the bluish color can be displayed more and more. Thus, the decrease of the chromaticity x and y, in contradistinction with "white", results in the increase of the color temperature. Further to get the decrease of the chromaticity x and y, the transmittance corresponding to the color matching function $\bar{z}(\lambda)$ should increase.

The thickness of the color filter is conventionally lessened in order to increase the transmittance. However, when decreasing the thickness of the blue color filter, the color purity of the blue is deteriorated and degraded, and thus, the color reproduction decreases.

Furthermore, another way of increasing the transmittance of the blue color for increasing the color temperature is to use a backlight having a strong blue-band wavelength. In this case, the brightness of the light from the backlight, however, may decrease. The power consumption dramatically increases, because the power consumed increases more than 5% whenever the color temperature of the backlight lamp increases by 2000K.

Moreover, since the transmission type LCD device shown in FIG. 1 uses the artificial light generated from the backlight device, the high power consumption is required although it has an advantage of displaying images in a dark place. To overcome this problem, a reflection type LCD device is proposed. In the reflection type LCD device, an opaque and reflective metallic material is used as a pixel electrode instead of the transparent conductive material. Thus, the pixel electrode made of reflective material reflects the light toward its incident direction to display images depending on the alignment of the liquid crystal molecules.

Meanwhile, cholesteric liquid crystal (CLC) has been researched and developed for being utilized as a color filter. The reflection type LCD device adopting the CLC color filter has great color reproduction and contrast ratio rather than that adopting an absorptive color filter. The CLC color filter utilizes the selective reflection of the cholesteric liquid crystal. Namely, the cholesteric liquid crystal (CLC) reflects the light having a certain wavelength in accordance with its helical pitch, i.e., selective reflection. Therefore, if the helical pitch of the CLC is fixed to correspond to the red, green or blue wavelength, the CLC produces red, blue or green color. Furthermore, the CLC determines the polarization of the light reflected thereby. If the liquid crystal molecules of the CLC is twisted counterclockwise (i.e., left-handed helical structure), the CLC reflects a left-handed circularly polarized component derived from the incident light. These characteristics distinguish the CLC from a dichroic mirror, which is a mirror reflecting a ray of a certain wavelength and transmitting a ray of the other wavelengths (e.g., featuring infrared light reflection and visible ray transmission).

FIG. 7 is a cross-sectional view of a reflective LCD device that adopts CLC color filters. In FIG. 7, cholesteric liquid crystal (CLC) color filters 230a, 230b and 230c act as not only a color filter layer but also a reflective plate, so that the reflective plate is not required additionally.

Referring to FIG. 7, a light-absorption layer 220 is disposed on the front surface of a lower substrate 210, and the LCD color filters 230a, 230b and 230c respectively representing red, green and blue colors are formed on the light absorption layer 220. The CLC color filters 230a, 230b and 230c reflect the light of red, green and blue wavelengths, respectively, such that color images are displayed by the combination of the red, green and blue colors. A first electrode 240 is disposed on the CLC color filters 230a, 230b and 230c.

On the rear surface of an upper substrate 250 that is spaced apart from the lower substrate 210, second electrodes 260a, 260b and 260c each corresponding to each CLC color filter 230a, 230b or 230c are formed respectively. A retardation film 270 having a retardance of λ/4 is disposed on the front surface of the upper substrate 250, and a polarizer 280 is formed on the retardation film 270. A liquid crystal (LC) layer 290 is interposed between the first and second electrodes 240 and 260, and the liquid crystal molecules of the LC layer 290 are arranged in accordance with an electric field applied between the first and second electrodes 240 and 260. Although not shown in FIG. 7, an alignment layer may be interposed between the light-absorption layer 220 and color filter layer 230. Further, two other alignment layers are formed on the first and second electrodes 240 and 260, respectively. Accordingly, the reflective LCD device adopting the CLC color filters 230a, 230b and 230c uses the second electrodes 260a, 260b and 260c as pixel electrodes, and each pixel electrode (second electrode) corresponds to each color filter. Further, a thin film transistor (TFT) as a switching element is connected to each pixel electrode on the upper substrate 250.

In the above reflective LCD device, a helical pitch of the CLC color filter, which corresponds to a light wavelength reflected by the CLC color filter, is determined by the exposure to an ultraviolet ray. The selective reflection wavelength is related to the refractive index ($\Delta n = n_e - n_o$) and the helical pitch (P) of the CLC color filter and can be expressed by $\Delta\lambda = \Delta n \cdot P$, $P_R > P_G > P_B$. Therefore, the reflection wavelength in the long wavelength band width (e.g., red light) widely ranges and distributes rather than that in the short wavelength band width.

A spectrum of the light reflected by the CLC color filter layer 230 of FIG. 7 is shown in FIG. 8. Since the selective reflection wavelength is set to an arbitrary value by varying the helical pitch of the CLC, the long wavelength band width is relatively wide. As a result, the tristimulus values X and Y increases and the chromaticity x and y, in contradistinction with "white", tends to approach the yellowish color, thereby decreasing the color temperature.

SUMMARY OF THE INVENTION

Accordingly, the present invention is directed to a cholesteric liquid crystal (CLC) color filter that substantially obviates one or more of the problems due to limitations and disadvantages of the related art.

An advantage of the invention is to provide a CLC color filter and a method of fabricating a CLC color filter that increases the brightness and resolution of the display images in the reflection type LCD device.

Another advantage of the invention is to provide a CLC color filter and a method of fabricating a CLC color filter that controls a color temperature without additional fabricating processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cholesteric liquid crystal (CLC) color filter layer includes a light-absorption layer on a substrate; and red, green and blue CLC color filters on the light-absorption layer, the red, green and blue CLC color filters reflecting light components of red, green and blue wavelengths, respectively; and wherein the red CLC color filter includes an additional blue CLC color filter therein. The CLC color filter further includes a green CLC color filter that includes the additional blue CLC color filter therein.

In accordance with the purpose of the invention, in another aspect, the principles of the present invention provide a cholesteric liquid crystal (CLC) color filter layer including: a light-absorption layer on a substrate; and red, green and blue CLC color filters on the light-absorption layer, the red, green and blue CLC color filters reflecting light components of red, green and blue wavelengths, respectively; and wherein the green CLC color filter includes an additional blue CLC color filter therein.

In accordance with the purpose of the invention, in another aspect, the principles of the present invention provide a cholesteric liquid crystal (CLC) color filter layer including: a light-absorption layer on a substrate; and red, green and blue CLC color filters on the light-absorption layer, the red, green and blue CLC color filters reflecting light components of red, green and blue wavelengths, respectively; and wherein the blue CLC color filter includes an additional red CLC color filter therein.

In accordance with the purpose of the invention, in another aspect, the principles of the present invention provide a cholesteric liquid crystal (CLC) color filter layer including: a light-absorption layer on a substrate; and red, green and blue CLC color filters on the light-absorption layer, the red, green and blue CLC color filters reflecting light components of red, green and blue wavelengths, respectively; and wherein the blue CLC color filter includes an additional green CLC color filter therein.

In another aspect, a method of forming a cholesteric liquid crystal (CLC) color filter layer includes: forming a light-absorption layer on a substrate; forming a cholesteric liquid crystal (CLC) layer on the light-absorption layer; and forming red, green and blue CLC color filters by applying an ultraviolet ray to the CLC layer, respectively; wherein the red, green and blue CLC color filters reflecting light components of red, green and blue wavelengths, respectively; and wherein forming the blue CLC color filter includes forming an additional blue CLC color filter in the red CLC color filter.

In the above-mentioned method, the additional blue CLC color filter is in periphery of the red CLC color filter. Forming the blue CLC color filter further includes forming the additional blue CLC color filter in the green CLC color filter, and the additional blue CLC color filter is beneficially in periphery of the green CLC color filter. The size of the additional blue CLC color filter is adjustable in the red CLC color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to illustrated embodiments of the present invention, examples of which are shown in the accompanying drawings. Wherever possible, similar reference numbers will be used throughout the drawings to refer to the same or similar parts.

Figure 1:
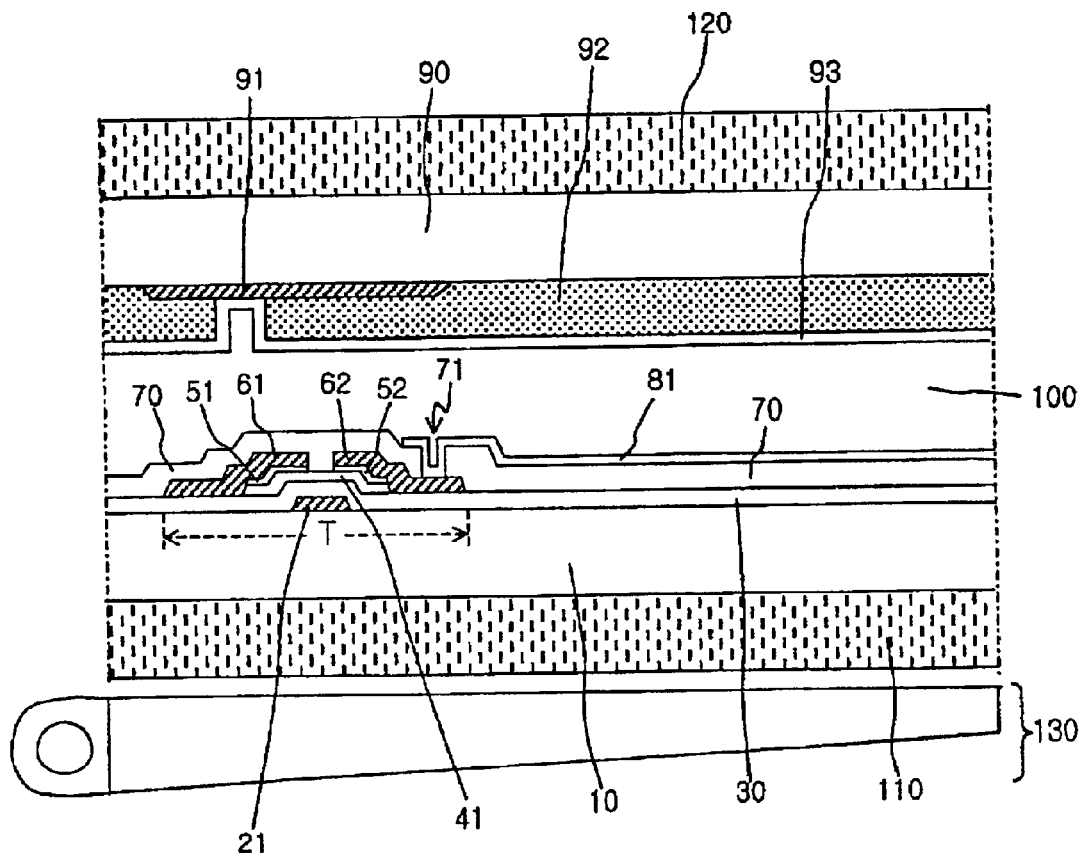
FIG. 1 is a cross-sectional view of a pixel of a conventional LCD device.
Figure 2:
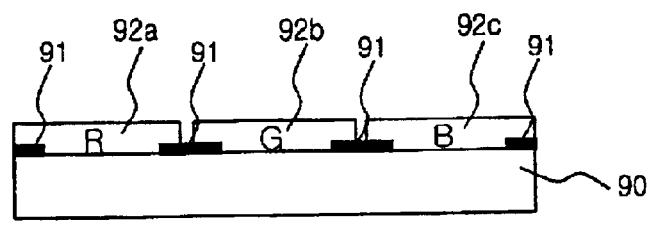
FIG. 2 is a cross-sectional view illustrating color filters of FIG. 1.
Figure 3:
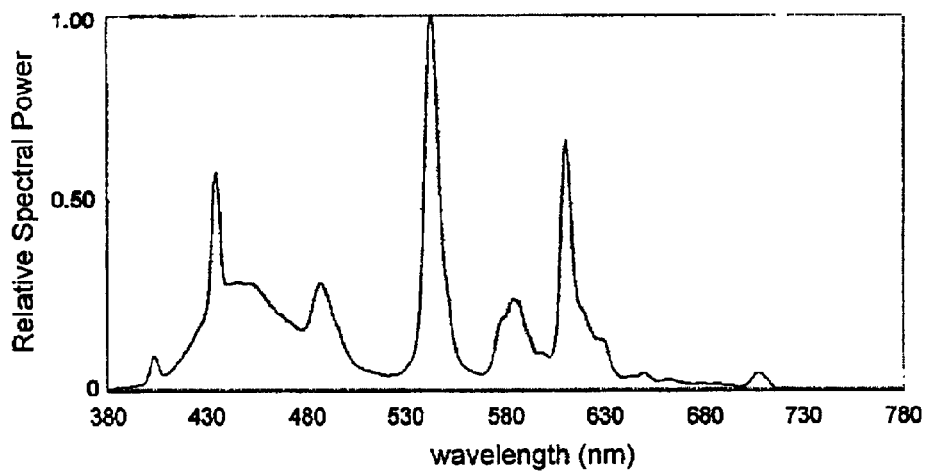
FIG. 3 is a graph illustrating relative spectral power with respect to a wavelength of spectrum.
Figure 4:
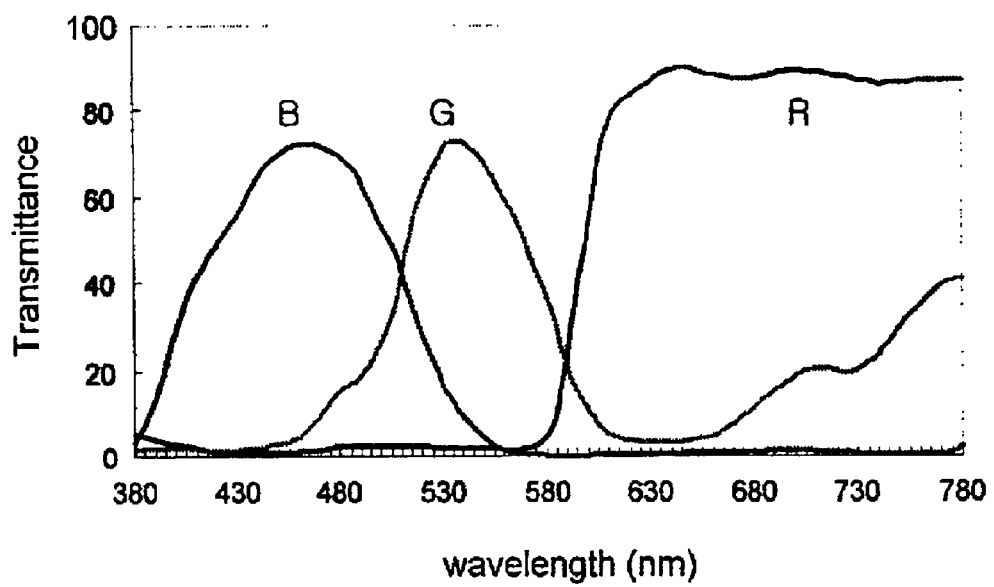
FIG. 4 is a graph demonstrating transmittance of light passing through color filters (R), (G) and (B)
Figure 5:
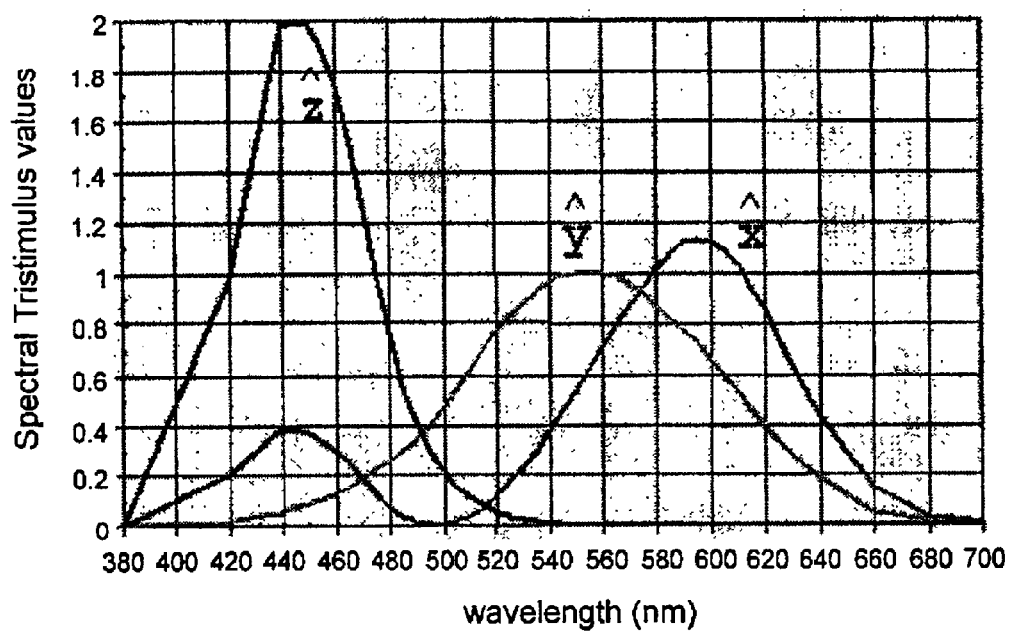
FIG. 5 a graph showing spectral tristimulus values with respect to a wavelength of spectrum.
Figure 6:
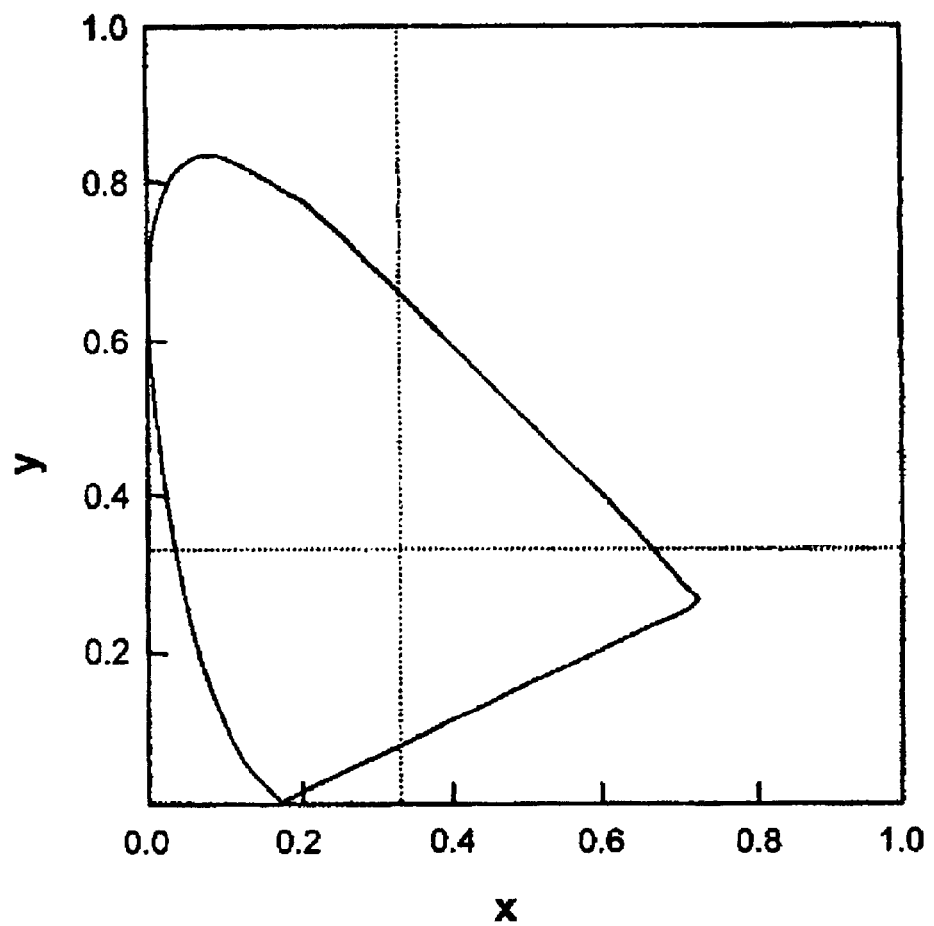
FIG. 6 is a chromaticity diagram of the chromaticity point according to Committee of International Emission.
Figure 7:
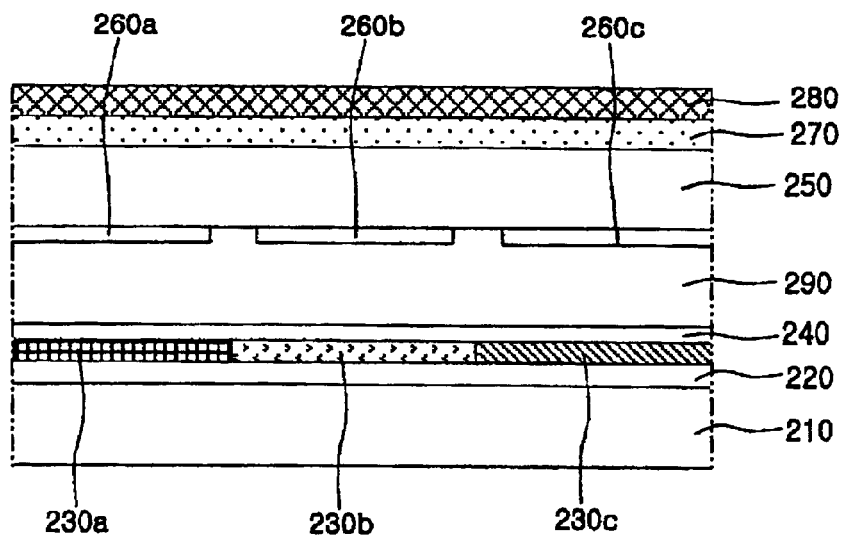
FIG. 7 is a cross-sectional view of a reflective LCD device that adopts CLC color filters according to the related art.
Figure 8:
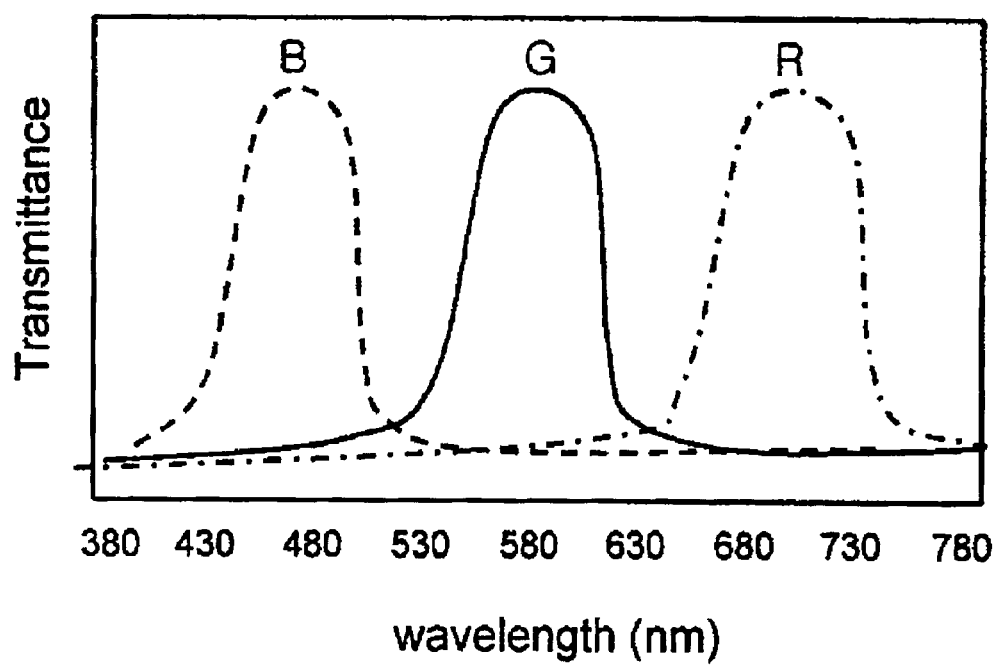
FIG. 8 is a graph illustrating a spectrum of the light reflected by the CLC color filter layer of FIG. 7.
Figure 9:
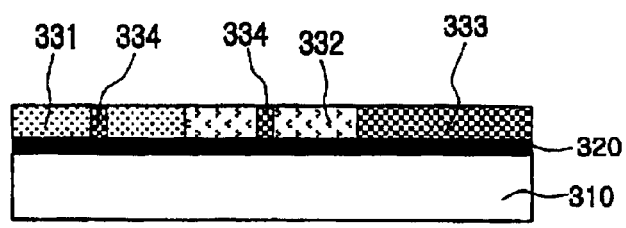
FIG. 9 a cross-sectional view illustrating a cholesteric liquid crystal (CLC) color filter layer according to the present invention.

FIG. 9 is a cross-sectional view illustrating a color filter layer according to the present invention. As shown in FIG. 9, a light-absorption layer 320 is formed on a substrate 310, and a cholesteric liquid crystal (CLC) color filter layer having the CLC color filters 331, 332, 333 and 334 is disposed on the light-absorption layer 320. The light-absorption layer 320 absorbs light transmitted through the CLC color filters 331, 332, 333 and 334. The CLC color filters 331, 332 and 333 reflect the light of red, green and blue wavelengths, respectively. At this point, the CLC color filters 334 that reflect the light of blue wavelength are additionally formed inside the red CLC color filter 331 and green CLC color filter 332.

Figure 10:
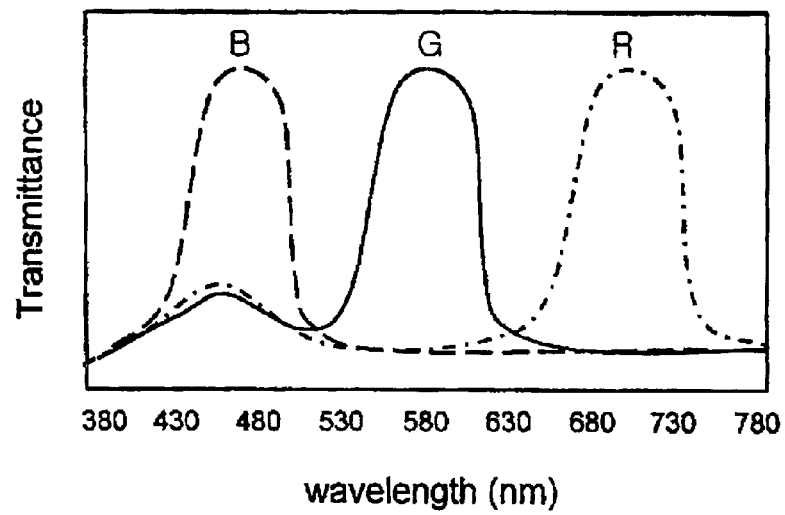
FIG. 10 is a graph illustrating a spectrum of the light reflected by the CLC color filter layer of FIG. 9.

A spectrum of the light reflected by the CLC color filter layer of FIG. 9 is shown in FIG. 10. In the graph of FIG. 10, since the red CLC color filter 331 and the green CLC color filter 332 include the additional blue CLC color filter 334, respectively, the light reflected by the red and green CLC color filters 331 and 332 includes a blue wavelength component, thereby increasing the transmittance of blue light. Therefore, since the tristimulus value Z is raised, the chromaticity x and y is together lowered and the color temperature of white color can increase.

When forming the blue color filter inside the red and green color filters to increase the transmittance of blue light, it is very difficult to apply the absorptive color filter to the structure and configuration shown in FIG. 9 because the absorptive color filter is formed using a photolithographic process and requires a space margin of about 10 micrometers during the photolithographic process. However, since the CLC color filters of the present invention have helical pitches that are adjusted by the exposure to the ultraviolet light, the blue CLC color filter is easily formed inside the red and green CLC color filters.

Namely, the red CLC color filter 331 and the green color filter 332 are first formed using the ultraviolet light exposure. Thereafter, when forming the blue CLC color filter 333 using a mask and ultraviolet light, the additional blue CLC color filter 334 is formed inside the red and green CLC color filters 331 and 332 using the same mask. Therefore, the CLC color filter layer (including the CLC color filters 331, 332, 333 and 334) can be fabricated without additional processes.

Figure 11A:
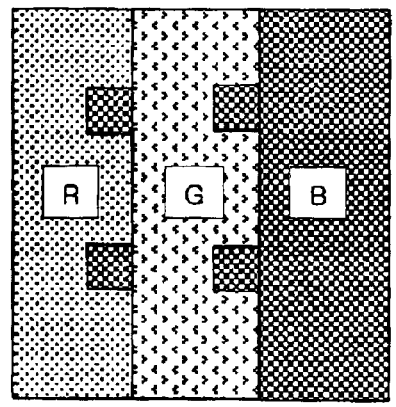
FIGS. 11A to 11C are plan views showing different embodiments of the CLC color filter according to present invention.
Figure 11B:
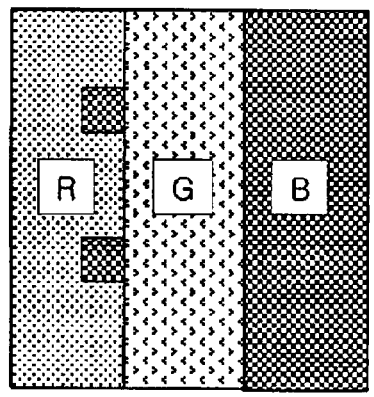
Figure 11C:
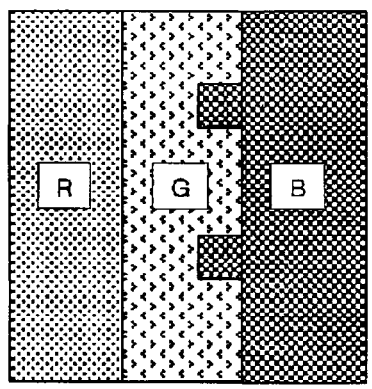

FIGS. 11A to 11C are plan views showing different embodiments of the CLC color filter layer according to present invention. FIG. 11A shows that the additional blue CLC color filter is formed in both the CLC red color filter and the CLC green color filter. FIG. 11B shows that the additional blue CLC color filter is formed only in the red CLC color filter. FIG. 11C shows that the additional blue CLC color filter is formed only in the green CLC color filter.

As shown in FIGS. 11A to 11C, the additional blue CLC color filter can be formed in the red CLC color filter, in the green CLC color filter, or in both the red and green CLC color filters, alternatively. Furthermore, the size of the additional blue CLC color filter is variable. When forming the additional blue CLC color filter in the red and/or green CLC color filter, it is very important that the additional blue CLC color filter is adjacent to the boundary between the CLC color filters. Namely, the additional blue CLC color filter should be in the periphery of the red and/or green CLC color filter because the additional blue CLC color filter may cause an interference color.

Meanwhile, although FIGS. 11A to 11C shows the method of constituting the CLC color filter layer implementing a bluish white to increase the color temperature, such a method can be adopted to implementing a yellowish white.

Figure 12:
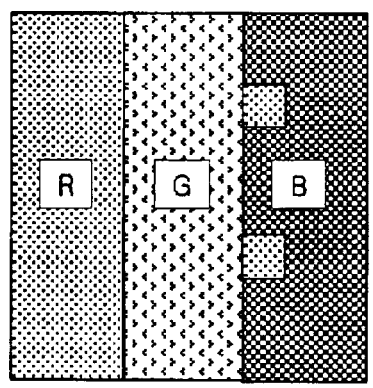
FIG. 12 a plan view of another embodiment of the CLC color filter layer according to the present invention.

FIG. 12 a plan view of another embodiment of the CLC color filter layer according to the present invention. When yellowish white is required in displaying images, an additional red CLC color filter is formed in the blue CLC color filter as shown in FIG. 12. Alternatively, an additional green CLC color filter can be formed in the blue CLC color filter. Therefore, the yellowish white can appear without additional processes if the CLC color filter layer shown in FIG. 12 is fabricated by the same method as that of forming the additional blue CLC color filter.

As described herein, the CLC color filter layer for reflective LCD device according to the principles of the present invention includes the additional blue CLC color filter in the red and/or green CLC color filter, thereby increasing the color temperature. Since the additional blue CLC color filter is formed using ultraviolet light when forming the blue CLC color filter, additional processes for the additional blue CLC color filter are not required. Furthermore, since the color temperature of the output light increases according to the CLC color filter layer of the present invention, high resolution is obtained in image display. Alternatively, the color temperature can be adjustable by way of forming an additional red and/or green CLC color filter inside the blue CLC color filter.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cholesteric liquid crystal (CLC) color filter layer, comprising:

a light-absorption layer on a substrate; and red, green and blue CLC color filters on the light-absorption layer, the red, green and blue CLC color filters reflecting light components of red, green and blue wavelengths, respectively; and wherein the red CLC color filter includes an additional blue CLC color filter therein in a same layer as the red CLC.

2. The CLC color filter of claim 1, further comprising a green CLC color filter that includes the additional blue CLC color filter therein.

3. A cholesteric liquid crystal (CLC) color filter layer, comprising:
   a light-absorption layer on a substrate; and
   red, green and blue CLC color filters on the light-absorption layer, the red, green and blue CLC color filters reflecting light components of red, green and blue wavelengths, respectively; and
   wherein the green CLC color filter includes an additional blue CLC color filter therein in a same layer as the green CLC.

4. A cholesteric liquid crystal (CLC) color filter layer, comprising:
   a light-absorption layer on a substrate; and red, green and blue CLC color filters on the light-absorption layer, the red, green and blue CLC color filters reflecting light components of red, green and blue wavelengths, respectively; and
   wherein the blue CLC color filter includes an additional red CLC color filter therein in a same layer as the blue CLC.

5. A cholesteric liquid crystal (CLC) color filter layer, comprising:
   a light-absorption layer on a substrate; and
   red, green and blue CLC color filters on the light-absorption layer, the red, green and blue CLC color filters reflecting light components of red, green and blue wavelengths, respectively; and
   wherein the blue CLC color filter includes an additional green CLC color filter therein in a same layer as the blue CLC.

6. A method of forming a cholesteric liquid crystal (CLC) color filter layer, comprising:
   forming a light-absorption layer on a substrate;
   forming a cholesteric liquid crystal layer on the light-absorption layer, and
   forming red, green and blue CLC color filters by applying ultraviolet light to the CLC layer, respectively;
   wherein the red, green and blue CLC color filters reflect light components of red, green and blue wavelengths, respectively; and
   wherein forming the blue CLC color filter includes forming an additional blue CLC color filter in the same layer as the red CLC color filter.

7. The method of claim 6, wherein the additional blue CLC color filter is in periphery of the red CLC color filter.

8. The method of claim 6, wherein forming the blue CLC color filter further comprises forming the additional blue CLC color filter in a same layer as the green CLC color filter.

9. The method of claim 8, wherein the additional blue CLC color filter is in periphery of the green CLC color filter.

10. The method of claim 6, wherein the size of the additional blue CLC color filter is adjustable in the red CLC color filter.

11. A method of forming a cholesteric liquid crystal (CLC) color filter layer, comprising:
    forming a light-absorption layer on a substrate;
    forming a cholesteric liquid crystal layer on the light-absorption layer; and
    forming red, green and blue CLC color filters by applying ultraviolet light to the CLC layer, respectively;
    wherein the red, green and blue CLC color filters reflect light components of red, green and blue wavelengths, respectively; and
    wherein forming the blue CLC color filter includes forming an additional blue CLC color filter in the same layer as the green CLC color filter.

12. The method of claim 11, wherein the additional blue CLC color filter is in periphery of the green CLC color filter.

13. The method of claim 11, wherein forming the blue CLC color filter further comprises forming the additional blue CLC color filter in a same layer as the red CLC color filter.

14. The method of claim 13, wherein the additional blue CLC color filter is in periphery of the red CLC color filter.

15. The method of claim 11, wherein the size of the additional blue CLC color filter is adjustable in the green CLC color filter.

16. A method of forming a cholesteric liquid crystal (CLC) color filter layer, comprising:
    forming a light-absorption layer on a substrate;
    forming a cholesteric liquid crystal layer on the light-absorption layer; and
    forming red, green and blue CLC color filters by applying ultraviolet light to the CLC layer, respectively;
    wherein the red, green and blue CLC color filters reflect light components of red, green and blue wavelengths, respectively; and
    wherein forming the red CLC color filter includes forming an additional red CLC color filter in the same layer as the blue CLC color filter.

17. The method of claim 16, wherein the additional red CLC color filter is in periphery of the blue CLC color filter.

18. The method of claim 16, wherein forming the blue CLC color filter further comprises forming the additional red CLC color filter in a same layer as the green CLC color filter.

19. The method of claim 18, wherein the additional red CLC color filter is in periphery of the green CLC color filter.

20. The method of claim 16, wherein the size of the additional red CLC color filter is adjustable in the blue CLC color filter.

21. A method of forming a cholesteric liquid crystal (CLC) color filter layer, comprising:
    forming a light-absorption layer on a substrate;
    forming a cholesteric liquid crystal layer on the light-absorption layer; and
    forming red, green and blue CLC color filters by applying ultraviolet light to the CLC layer, respectively;
    wherein the red, green and blue CLC color filters reflect light components of red, green and blue wavelengths, respectively; and
    wherein forming the green CLC color filter includes forming an additional green CLC color filter in the same layer as the blue CLC color filter.

22. The method of claim 21, wherein the additional green CLC color filter is in periphery of the blue CLC color filter.

23. The method of claim 21, wherein forming the blue CLC color filter further comprises forming the additional green CLC color filter in a same layer as the red CLC color filter.

24. The method of claim 23, wherein the additional blue CLC color filter is in periphery of the red CLC color filter.

25. The method of claim 21, wherein the size of the additional green CLC color filter is adjustable in the blue CLC color filter.

* * * * *